United States Patent
Smith et al.

(10) Patent No.: US 6,360,899 B1
(45) Date of Patent: Mar. 26, 2002

(54) CORD WRAP WITH INTEGRALLY MOLDED LIGHT HOLDERS AND METHOD FOR MAKING SAME

(75) Inventors: Jeffrey B. Smith; William E. Adams; Matthew French, all of Lawrence County, PA (US)

(73) Assignee: Adams Mfg. Corp., Portersville, PA (US)

(*) Notice: Subject to any disclaimer, the term of this patent is extended or adjusted under 35 U.S.C. 154(b) by 0 days.

(21) Appl. No.: 09/220,516

(22) Filed: Dec. 24, 1998

(51) Int. Cl.⁷ .................................................. A47F 5/00
(52) U.S. Cl. ......................... 211/26; 206/420; 425/588
(58) Field of Search .................. 211/26, 13.1; 425/588; 206/419, 420; 446/87.88

(56) References Cited

U.S. PATENT DOCUMENTS

| | | | |
|---|---|---|---|
| 3,013,308 A | * | 12/1961 | Amour |
| 3,057,028 A | * | 10/1962 | Lorber |
| 3,443,786 A | * | 5/1969 | Bachner |
| 3,634,965 A | * | 1/1972 | McAuley |
| 4,734,027 A | | 3/1988 | Adams |
| 5,064,607 A | | 11/1991 | McAllister et al. |
| 5,222,602 A | | 6/1993 | Liao |
| 5,419,527 A | | 5/1995 | Adams |
| 5,458,241 A | | 10/1995 | Brown |
| 5,494,432 A | * | 2/1996 | Coggins et al. ......... 425/588 X |
| 5,511,661 A | | 4/1996 | Karlis et al. |
| 5,520,311 A | * | 5/1996 | Lam ............................ 223/85 |
| 5,653,339 A | * | 8/1997 | Dobson ...................... 206/420 |
| D386,003 S | * | 11/1997 | Schroeder et al. |
| 5,711,421 A | * | 1/1998 | Guo |
| 6,142,405 A | * | 11/2000 | Black |

OTHER PUBLICATIONS

Brochure, "Adams Suction Cups & More!", Dec., 1994.
Photocopy of Lites–Up "26 All–in–One Clips, Plus", Fall 1998.
Photocopy of "Handy Products Co. Outdoor Christmas Light Holders for Gutters", Fall 1998.
Photocopy of "Handy Products Co. Outdoor Christmas Light Holders", Fall 1998.
Photocopy of "Quik Klip Double String Gutter Light Klips", Fall 1998.

\* cited by examiner

Primary Examiner—Robert W. Gibson, Jr.
(74) Attorney, Agent, or Firm—Buchanan Ingersoll, P.C.

(57) ABSTRACT

A cord wrap with integrally molded light holders and mold and method of making same is disclosed. The light holders are molded in cavities connected by runners. The runners are shaped and positioned to form a cord wrap. After the light holders are broken away from the runners, the runner can be used as a cord wrap to store strings of decorative lights such as those which were held by the light holders.

25 Claims, 15 Drawing Sheets

CORD WRAP WITH INTEGRALLY MOLDED LIGHT HOLDERS AND METHOD FOR MAKING SAME

BACKGROUND OF THE INVENTION

1. Field of the Invention

This invention relates to a cord wrap and light holders, which are used with strings of decorative lights.

2. Description of the Prior Art

Injection molding processes commonly involve the use of two or more dies which fit together to define at least one enclosed space. This space or cavity has the shape of the articles to be molded. When small articles are manufactured, there are usually several cavities in a single mold which are connected by passageways or runners. Plastic material is injected into the mold and runs along the runners into the mold cavities. After the molded resin has cooled sufficiently, the mold halves are separated and the articles are removed from the cavities. The plastic that cooled in the runners forms arms which interconnect the molded workpieces. As the molded articles are removed from the cavities, they remain connected to the plastic arms, known as "runners," through which the plastic "runs" during molding. They must then be broken away from these arms. The separation process is a manual operation done either at the factory or by the purchaser. When such manual separation is a part of the manufacturing process, it increases the cost of manufacture. Normally, regardless of who removes the molded articles from the runners, the runners are simply thrown away or recycled because these runners previously had no use once the articles were removed from them.

Sometimes, the molded articles are sold while attached to the runners. This has been the standard way to sell plastic models. When articles are sold in this way, the user removes the desired pieces from the runners and discards the runners. Selling parts attached to runners reduces the manufacturer's labor costs, but the manufacturer loses the material in the runners which he otherwise could have recycled.

There have been developed several devices for holding decorative lights on houses. Most of these devices include hooks that fit over a gutter, or stake portions that slip between overlapping roofing shingles. Examples of such light holders are disclosed in U.S. Pat. Nos. 5,141,192; 5,669,709; 5,772,166; 5,531,441; U.S. Pat. No. Des. 356, 246; and U.S. Pat. No. Des. 356,492.

Decorative lights are sold in strings containing several light bulbs. The number of lights on a string may vary from as few as 12 to as many as 150 depending upon the size of the light bulbs. A common decorative light set contains 25 lights. Typically the purchaser of such lights will discard the package in which the lights are purchased and will coil the light string for storage. To assist the owner of decorative light sets to store his lights there are available in the market several different types of cord wraps. One common type of cord wrap is configured like the letter "H" but has two spaced-apart cross bars. This product is commonly made of molded plastic and packaged in a sleeve which fits around the sides.

Recently manufacturers of light holders have begun selling their light holders attached to runners with a card affixed to this combined structure. The card may have slots through which the light holders are attached to the card. A hole is provided in the card to allow the package to be hung on a rod. Such packaging is significantly less expensive than blister packages and clam shell packages commonly used for light holders.

There is a need for a molded plastic product designed in which the runners form a useful part of the product. Then the runners need not be removed and recycled but provide added value to the product.

SUMMARY OF THE INVENTION

We provide a cord wrap with integrally molded articles. The cord wrap body has two spaced apart and substantially parallel sides. At least two cross bars connect the sides. The sides and cross bars have a cross-section sufficiently large in diameter so that they can act as runners during molding. A plurality of molded articles are frangibly attached to the cord wrap body. When the parts are removed, the runner, rather than being discarded, may be used as a light string storage device known as a cord wrap.

We also provide a mold for forming a cord wrap and integrally molded articles. The mold block has a plurality of cavities shaped to form molded articles. The mold block also has at least two mold sections that have mating faces which can be moved apart to open the cavities. Two spaced apart and substantially parallel side runners are connected by two cross runners. Each cavity is connected to a runner so that plastic can be injected through the runners into the cavities. Additionally, we provide the process of making a cord wrap with integrally molded articles.

DESCRIPTION OF THE PREFERRED EMBODIMENTS

Figure 1:
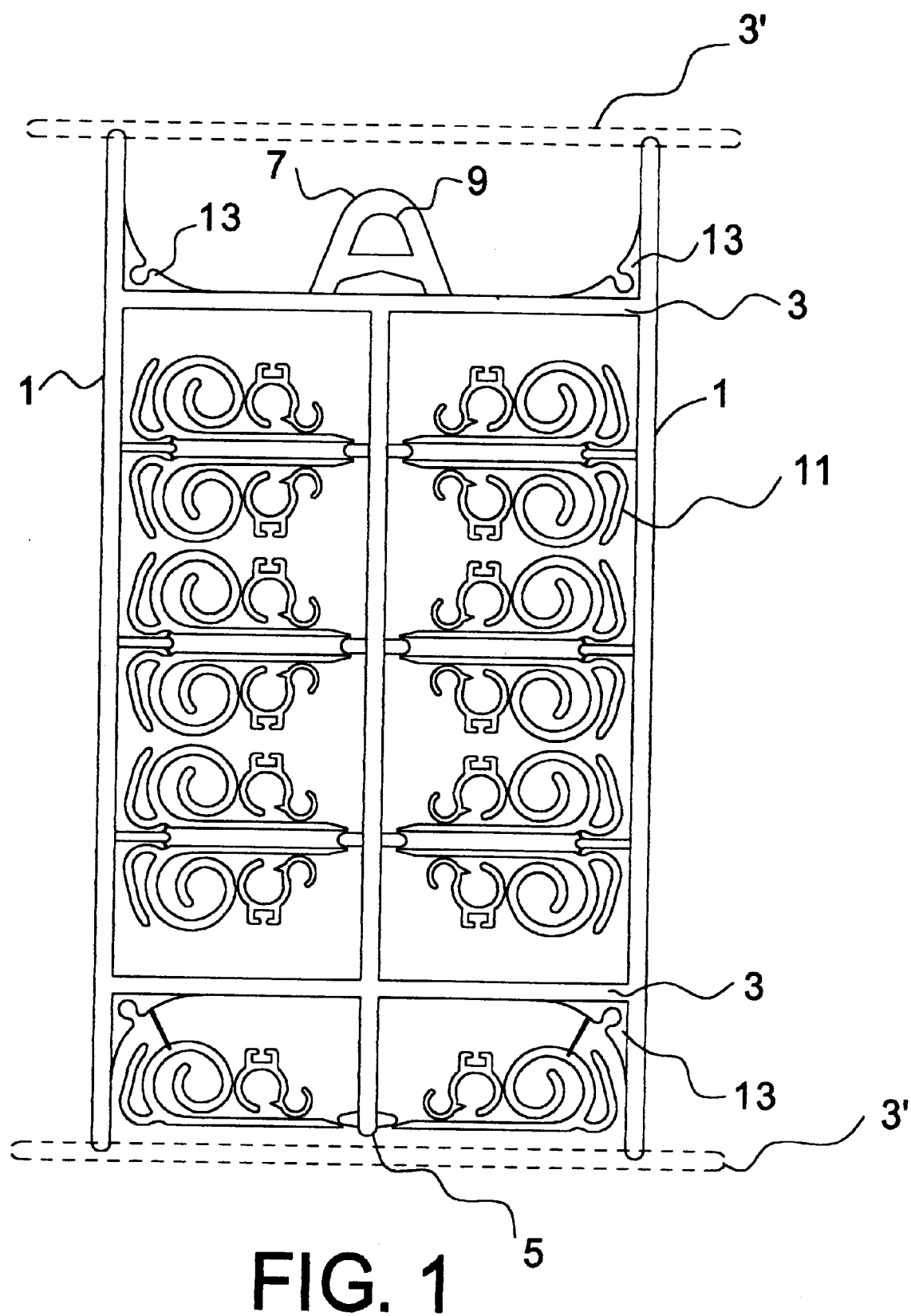
FIG. 1 is a front view of a present preferred embodiment of our cord wrap with integrally molded light holders.
Figure 2:
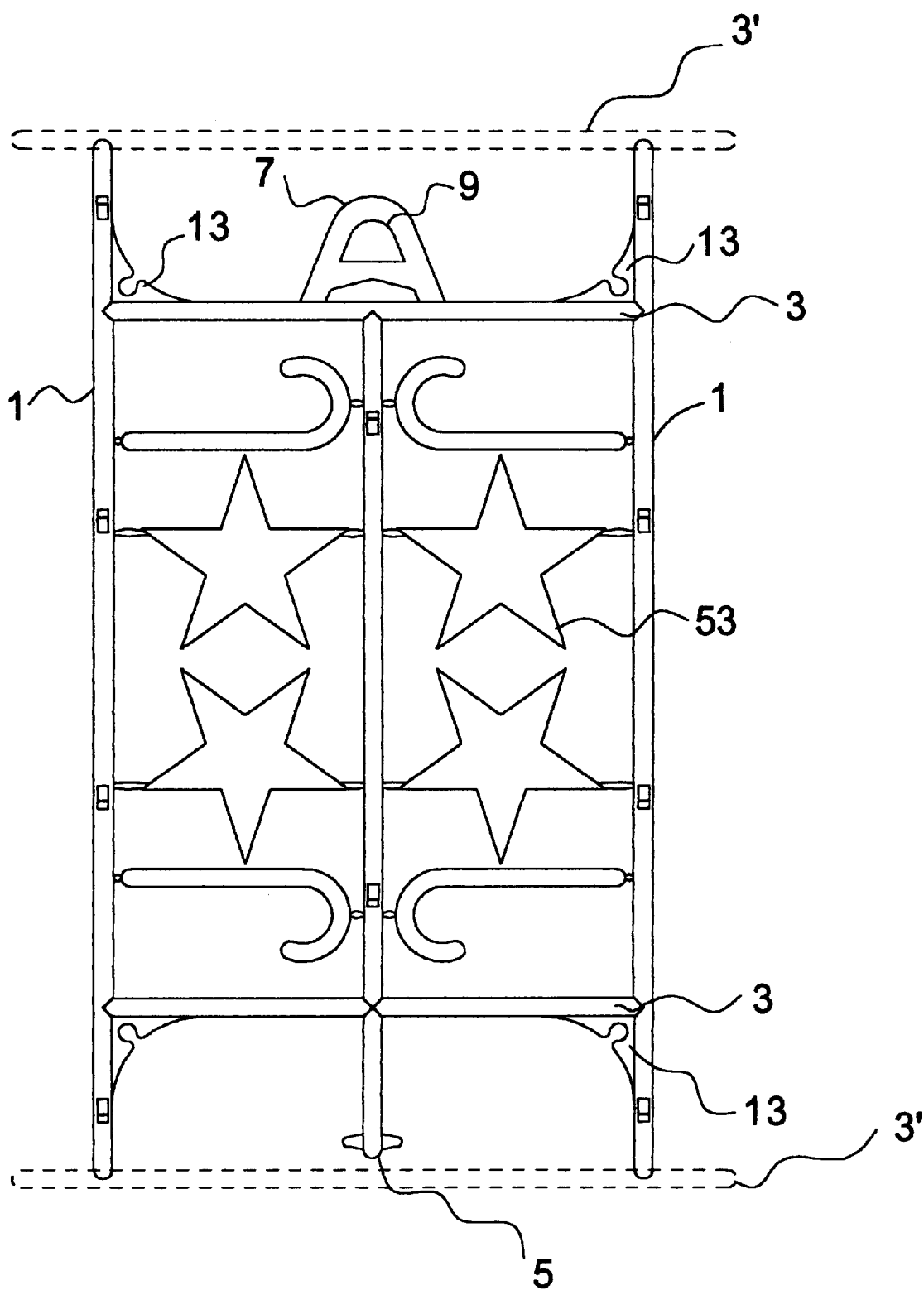
FIG. 2 is a front view of our cord wrap with integrally molded decorations and decoration hangers.
Figure 3:
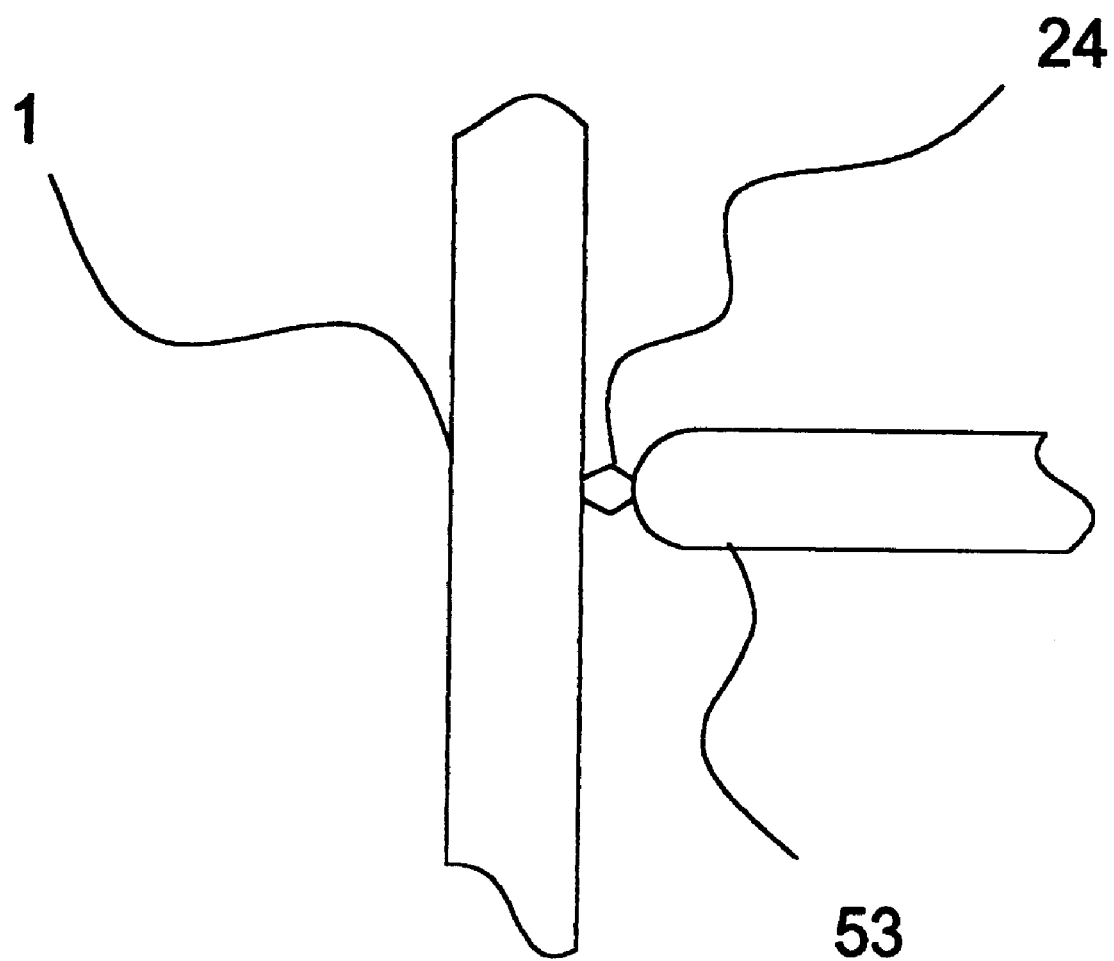
FIG. 3 is an enlarged view of a frangible member connecting a molded decoration hanger to a side.

A present preferred embodiment of our cord wrap with integrally molded light holders shown in FIG. 1 is comprised of sides 1 and a center post 5. Two cross bars 3 run perpendicular to and connect the sides 1 and the center post 5. Although the cross bars are shown to be perpendicular to the sides, the cross bars could be attached at any angle to the sides and extend beyond the sides as indicated by dotted lines 3'. It is also not necessary that there be a center post. If desired, more cross bars may be used to strengthen the cord wrap. Hanger 7, having opening 9, extends from a cross bar 3. The hanger enables the cord wrap to be hung from a rod in a display case in stores. Each of the buttresses 13 are attached to one side 1 and one cross bar 3 near the intersection of the side 1 and cross bar 3. The buttresses serve to strengthen the cord wrap. Light holders 11 are attached by frangible members 24 to the center post 5 or a side 1 as can be clearly seen in FIG. 3. The acute angle formed on the frangible members 24 and the notch 26 between the molded article and the cord wrap helps the frangible member to break away cleanly from the molded article and the cord wrap so that no vestige of plastic is left on either piece. The light holders are configured so that they may fit over a gutter or the stake portions may be slipped between overlapping roofing shingles. Alternatively, any molded plastic light holder or objects may be attached to the post, sides, or cross bars. The product shown in FIG. 2 is identical to the embodiment of FIG. 1 except that FIG. 2 illustrates an embodiment which has molded Christmas tree ornaments 53 instead of light holders.

Figure 4:
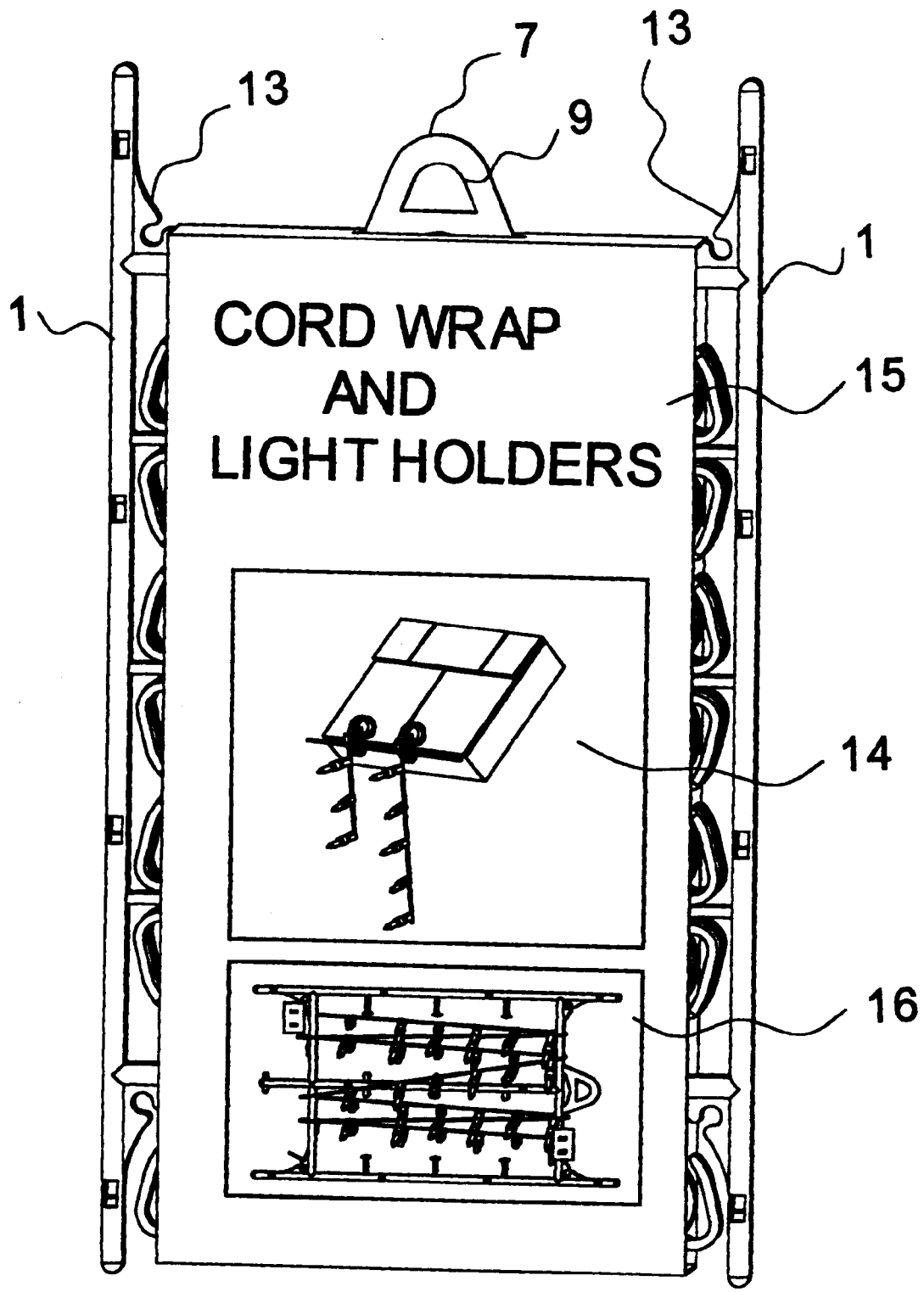
FIG. 4 is a front view of the embodiment of FIGS. 1 and 2 with a sleeve fitted around the cross bars.

We prefer to provide a sleeve 15 which fits around the cross bars can be seen in FIG. 4. Sleeve 15 is to be used in packaging and display of the cord wrap in stores. One side of the sleeve 15 can display pictures showing use of the light holders 14 and cord wrap 16. Directions for its use may appear on the back (not shown). The cord wrap could also be packaged and displayed with a transparent plastic wrapper (not shown) used in place of the sleeve 15.

Figure 5:
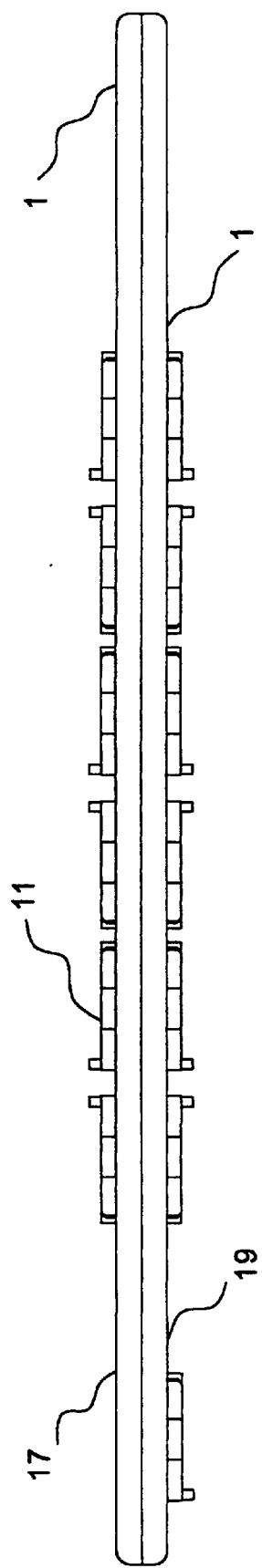
FIG. 5 is a side view of the front and rear portions of a cord wrap with integrally molded light holders.

The cord wrap may be a single molded piece. However, we prefer to construct the device in two halves 17 and 19 which are snapped together forming the structure shown in FIG. 5. Making the device in two halves enables us to use a smaller mold and allows the packaging to be more compact. This lowers the costs of shipping and storage. The two halves are shown in a mold in FIG. 9. The front portion of the cord wrap body 17 has twelve light holders 11 between the cross bars 3. The rear portion 19 of the cord wrap body has fourteen light holders 11 so that the total number of light holders that would come in a package is twenty-six. Any number of light holders may be on either portion of the body. However, we prefer to have twenty-six light holders because a common string of lights contains twenty-five lights.

Figure 6:
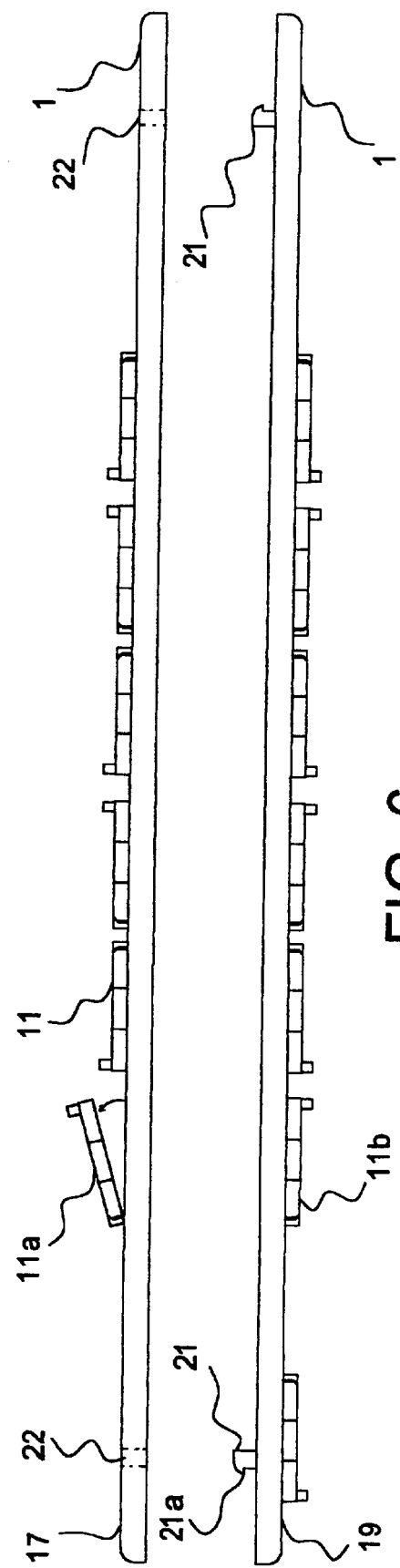
FIG. 6 is an exploded side view of a cord wrap with integrally molded light holders.

Referring to FIG. 6 the front and rear portions are attached by clips 21 which fit through clip openings 22. Each clip has at least one molded plastic protrusion 21a on the rear portion 19 of the cord wrap body. Each clip fits within an aperture 22 on the front portion 17. The protrusions and the apertures are configured so that once the protrusions are placed inside the apertures they cannot be easily removed. Any means for attachment may be used to attach the front and rear portions as the kind of attachment used is not important to the invention.

Figure 7:
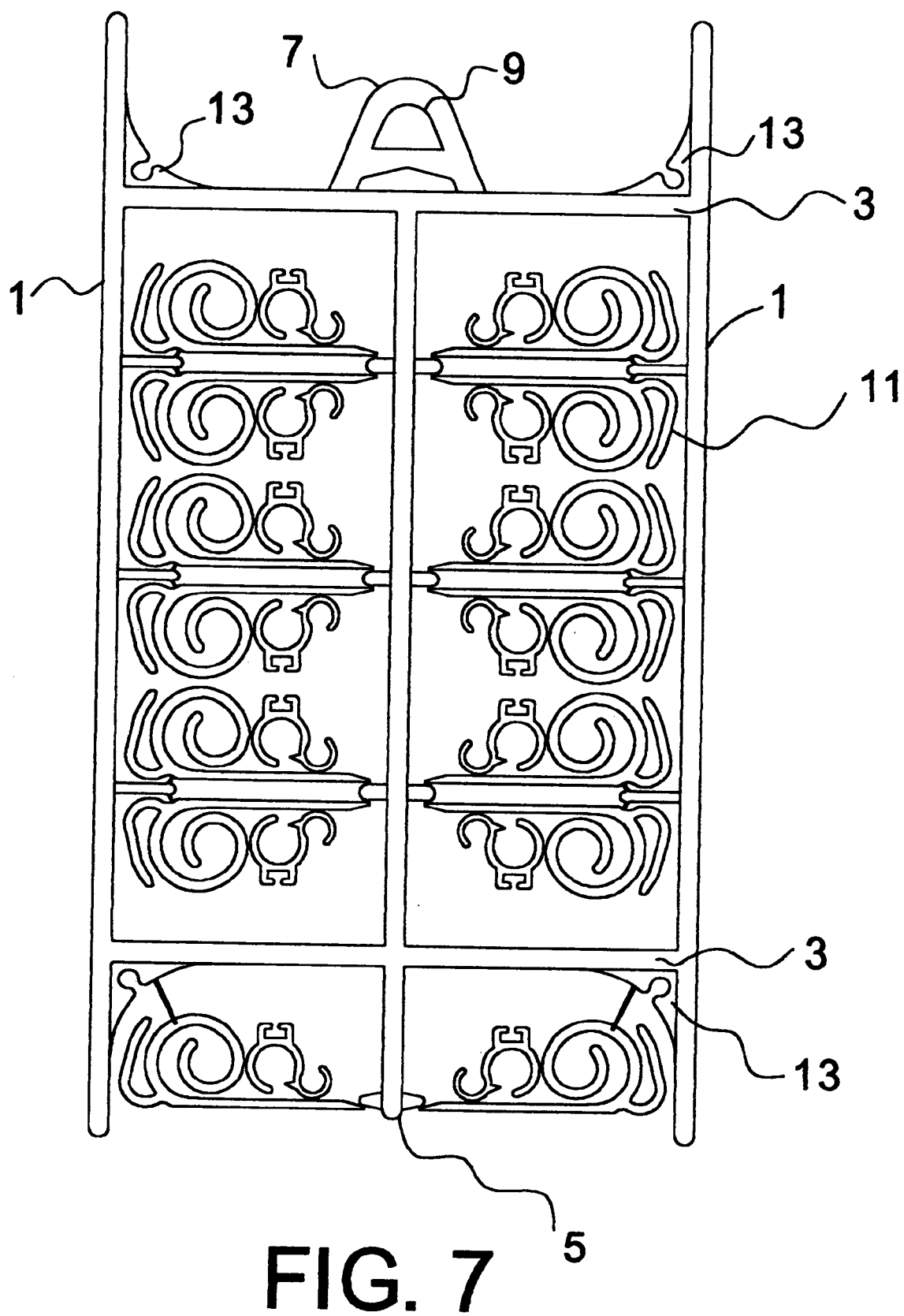
FIG. 7 is a front view of a cord wrap with integrally molded light holders with one light holder removed.
Figure 8:
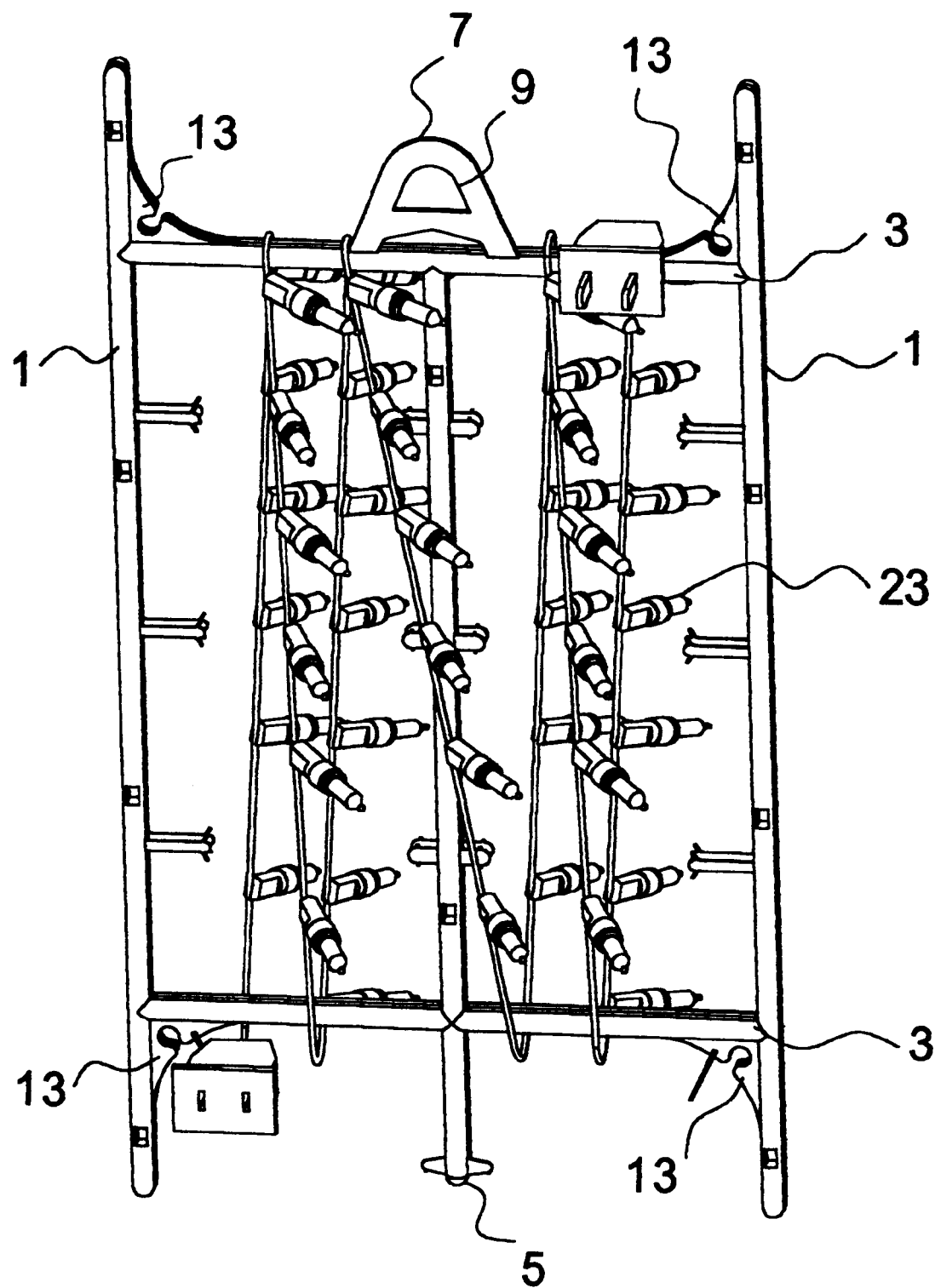
FIG. 8 is a front view of cord wrap with the light holders removed and a string of lights around the cord wrap.

The light holders are frangibly attached to the body. Therefore, they can be removed from the cord wrap simply by grasping a light holder with one hand and twisting it with respect to the cord wrap. Light holder 11a in FIG. 6 is shown being twisted away from the side 1 of the cord wrap body. The other light holders 11 are shown in typical exploded view orientation above the cord wrap body. After light holders 11a and 11b have been removed the first embodiment will appear as shown in FIG. 7. After all of the light holders have been removed a string of lights 23 is wrapped around the cord wrap for storage as illustrated in FIG. 8. Light holders could remain between the cross bars when the light string is wrapped around the cord wrap.

Figure 9:
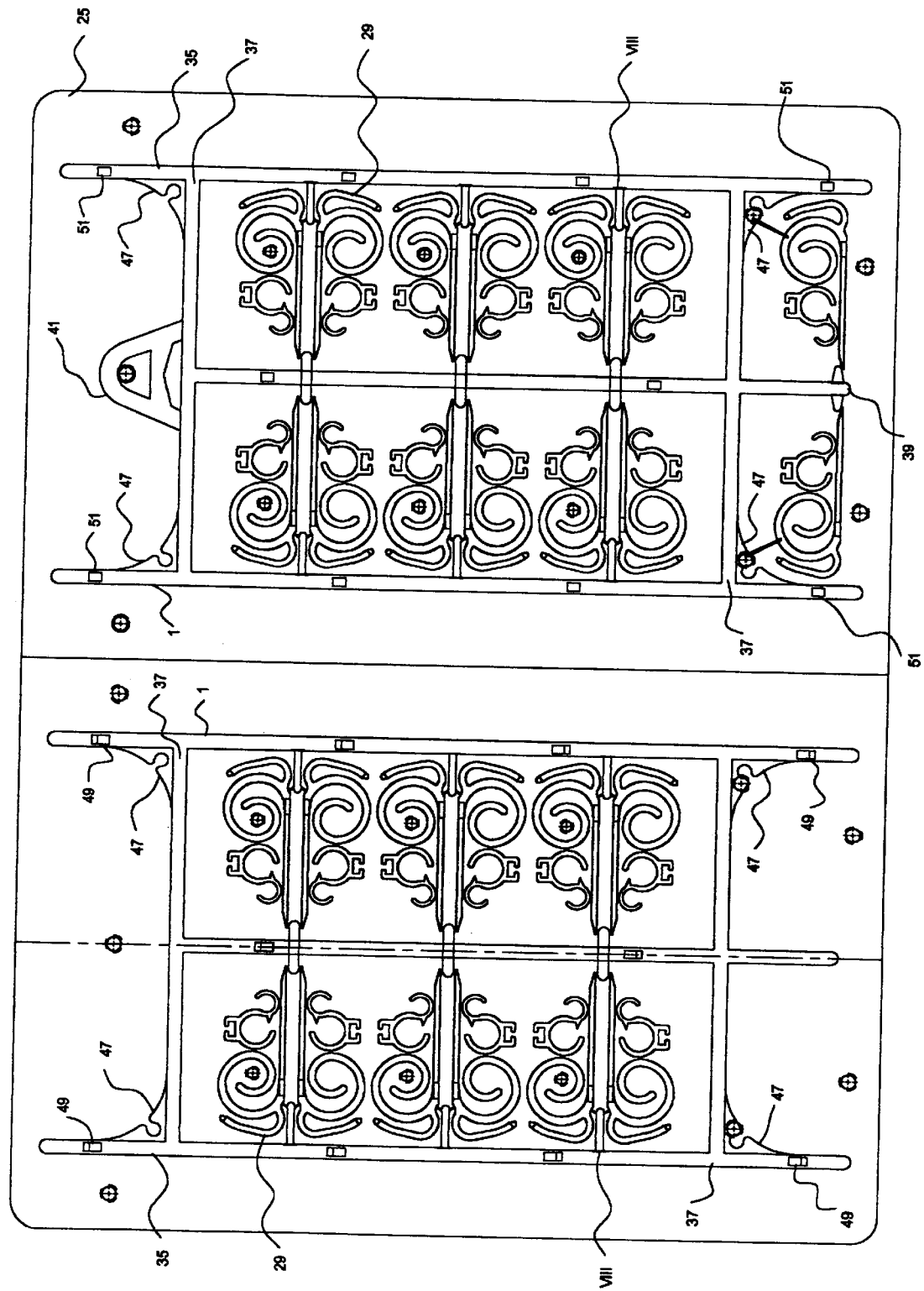
FIG. 9 is a top view of the female mold for a cord wrap with integrally molded light holders.
Figure 10:
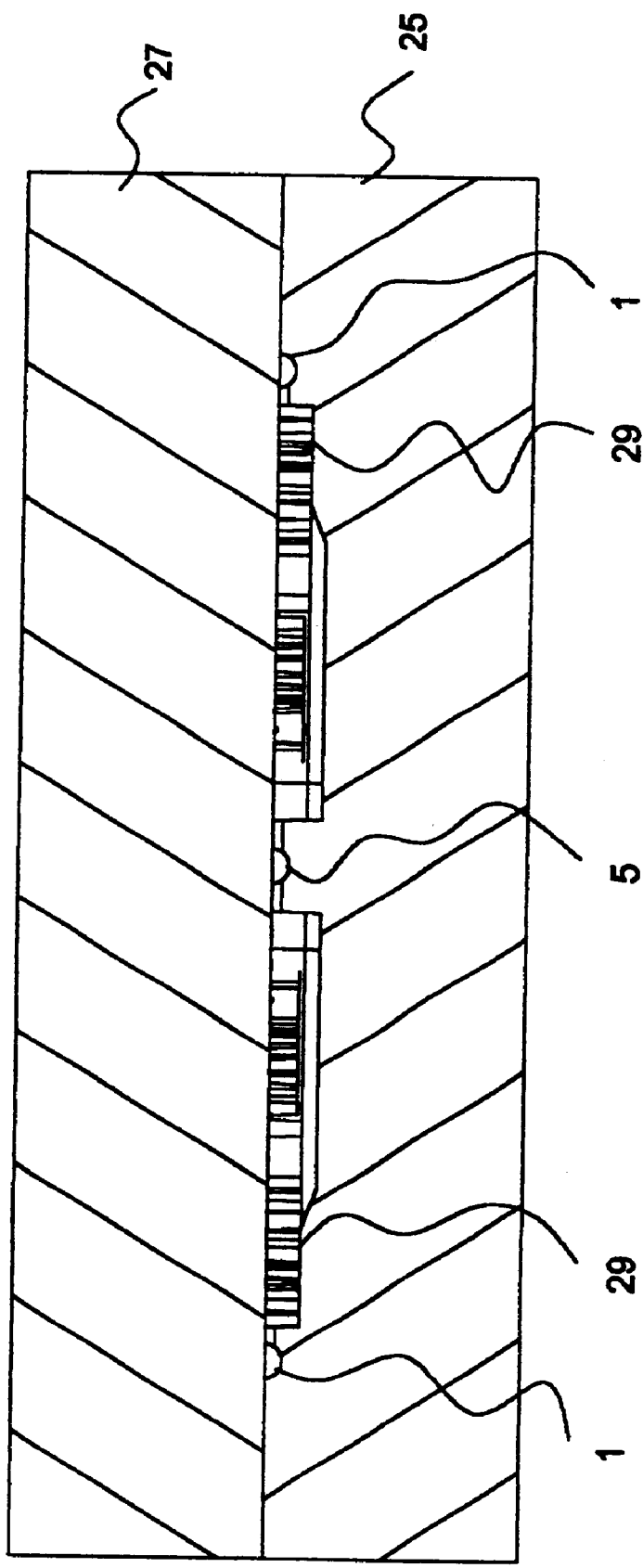
FIG. 10 is a cross-sectional view of a two piece mold in which one of the two pieces is the female mold shown in FIG. 9.

Our cord wrap with integral light holders could be formed in a two piece mold. FIGS. 9 and 10 show the female mold portion 25 of a two piece, twenty-six cavity mold for making the cord wrap and integrally molded light holders shown in FIGS. 1 and 4 through 8. The male mold portion 27 can be seen in FIG. 10. Clip cavities 49 and clip posts 51 will form the clips 21 and clip openings 22 respectively. Likewise, the hanger cavity 41 will form hanger 7 and buttress cavity 47 will form buttress 13. The center runner 39, cross runners 37 and side runners 35 connect mold cavities 29. Plastic can flow to all of the cavities 29 through the runners. After the cavities 29 are filled with plastic and the plastic cools, the male portion of the mold is separated from the female portion 25. The mold has gates which direct plastic from the runners to the cavities. These gates are shaped to provide a frangible connection that can be cleanly broken away from the cord wrap without leaving a vestige of plastic attached to the cord wrap or molded articles. Plungers (not shown) are provided to eject the light holders and cord wrap from the female mold 25. After the mold opens and the part is removed the manufacturer does not need to remove anything but can simply package the entire resulting molded plastic structure. The entire structure is also useful to the consumer who can use the plastic piece that cooled in the runners as a cord wrap.

Figure 11:
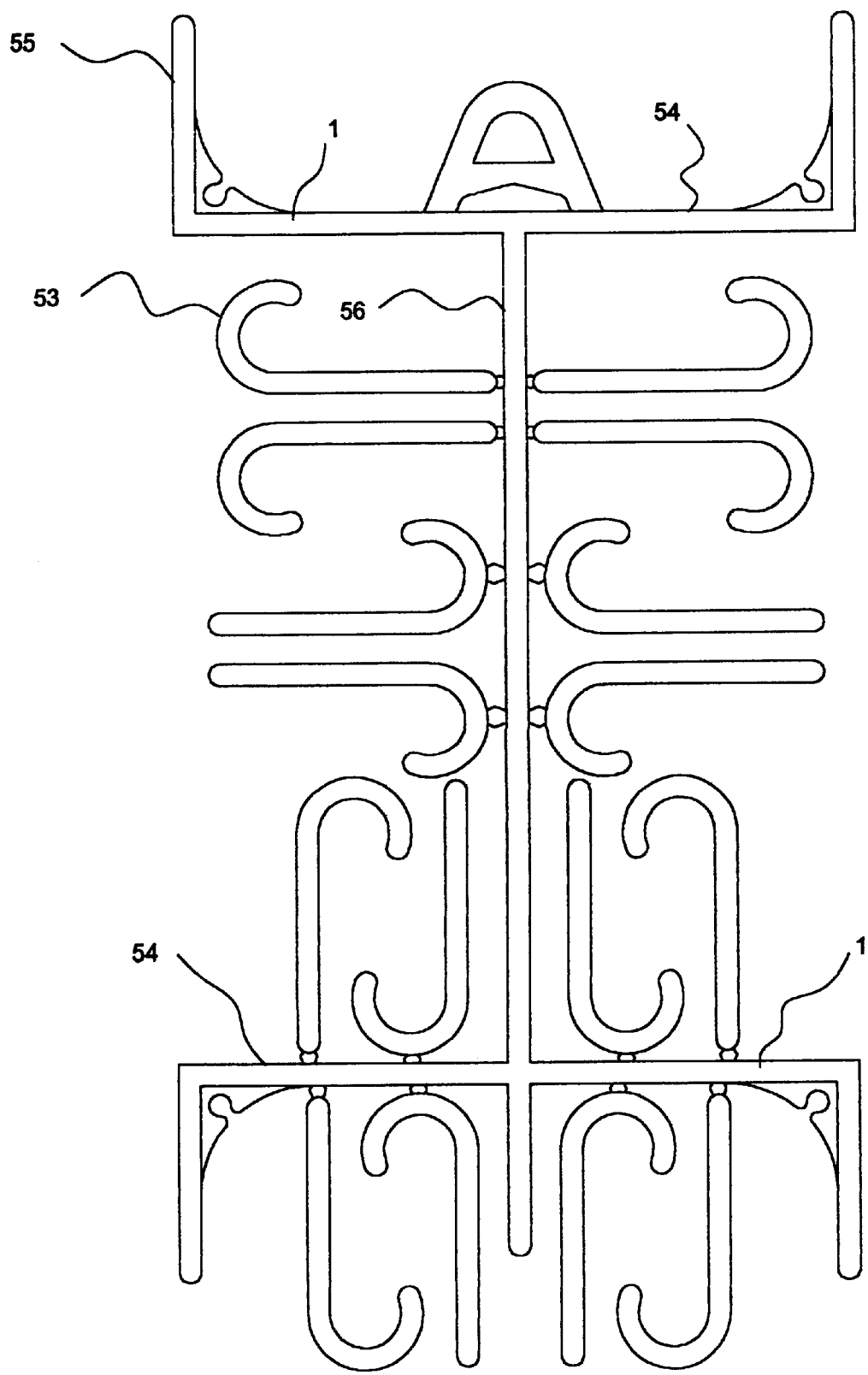
FIG. 11 is a front view of a second embodiment of our cord wrap with integrally molded decoration hangers.
Figure 12:
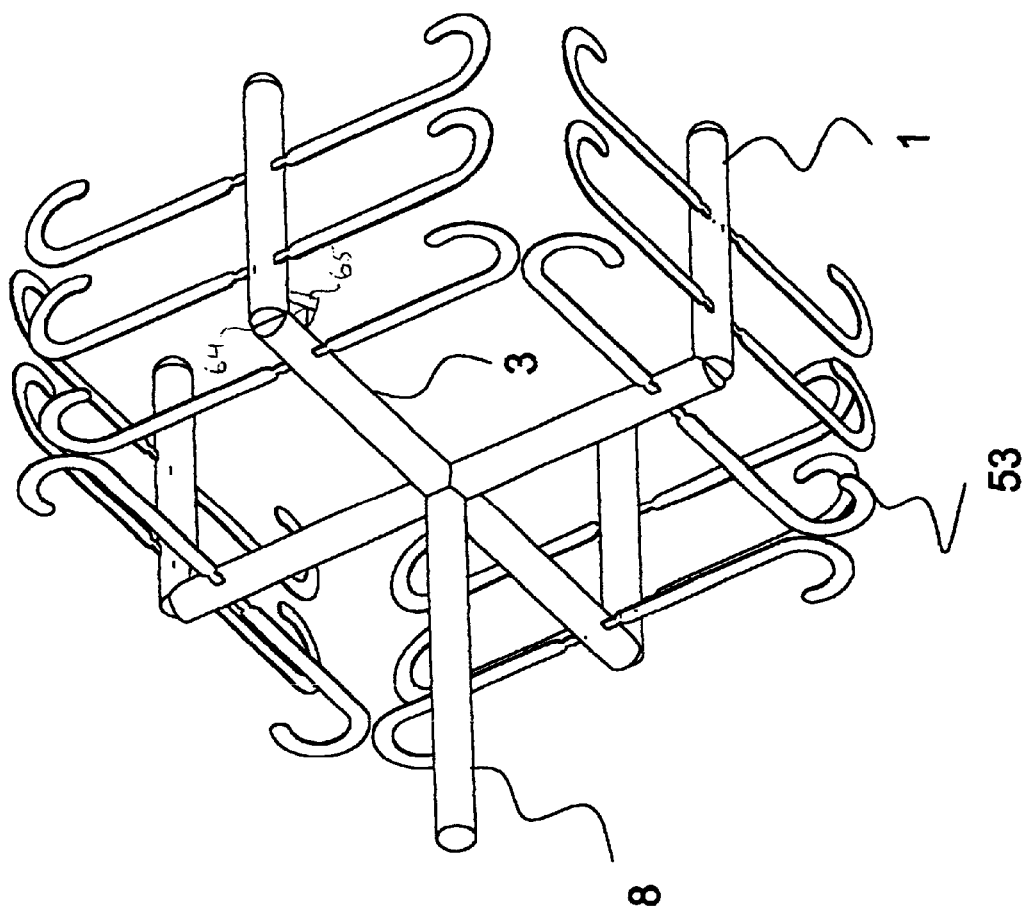
FIG. 12 is a perspective view of a third embodiment of our cord wrap with integrally molded decoration hangers.
Figure 13:
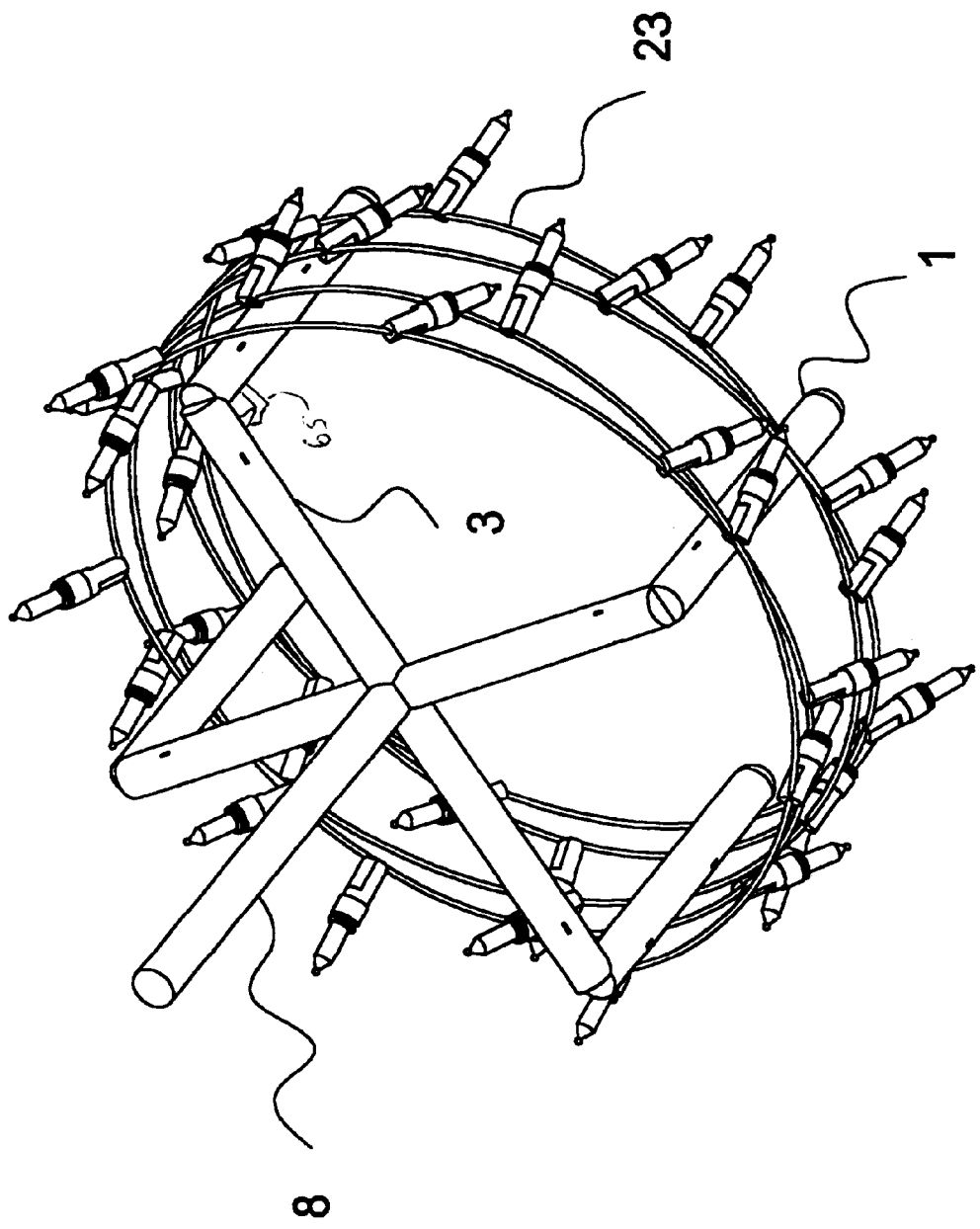
FIG. 13 is a perspective view similar to FIG. 12 showing a cord wrapped around the light holder.

Although a generally "H" shaped cord wrap is preferred, the runners which form the cord wrap could be positioned differently. For example, the embodiment of FIG. 11 has two U-shaped ends 54 having uprights 55. These ends are separated by a single center post 56. Another embodiment shown in FIGS. 12 and 13 has four cross bars 3 all connected at a handle 8. Each cross bar 3 is perpendicular to a side 1. The sides are parallel to handle 8. Light holders 53 are frangibly attached to either side of cross bars 3 so that the embodiment can be made in a two piece mold. A more complex and expensive mold may be used to mold light holders which extend from the sides 1. Alternatively, a simple two piece mold could be used if the sides 1 and cross bars 3 are molded in substantially the same plane along with a snap hinge 64 which allows the sides 1 to be positioned perpendicular to the cross bars 3 and locked in place after molding. The snap hinge can be a score line where a cross bar 3 meets a side 1 and a locking tab 65 extending from side 3 which locks the side 1 into the desired position. We prefer that the cross bar 3 be perpendicular to the side in this embodiment. A similar snap hinge is more fully described and shown in U.S. Pat. No. 5,419,527. A cord 23 may be wrapped around sides 1 as shown in FIG. 13.

Figure 14:
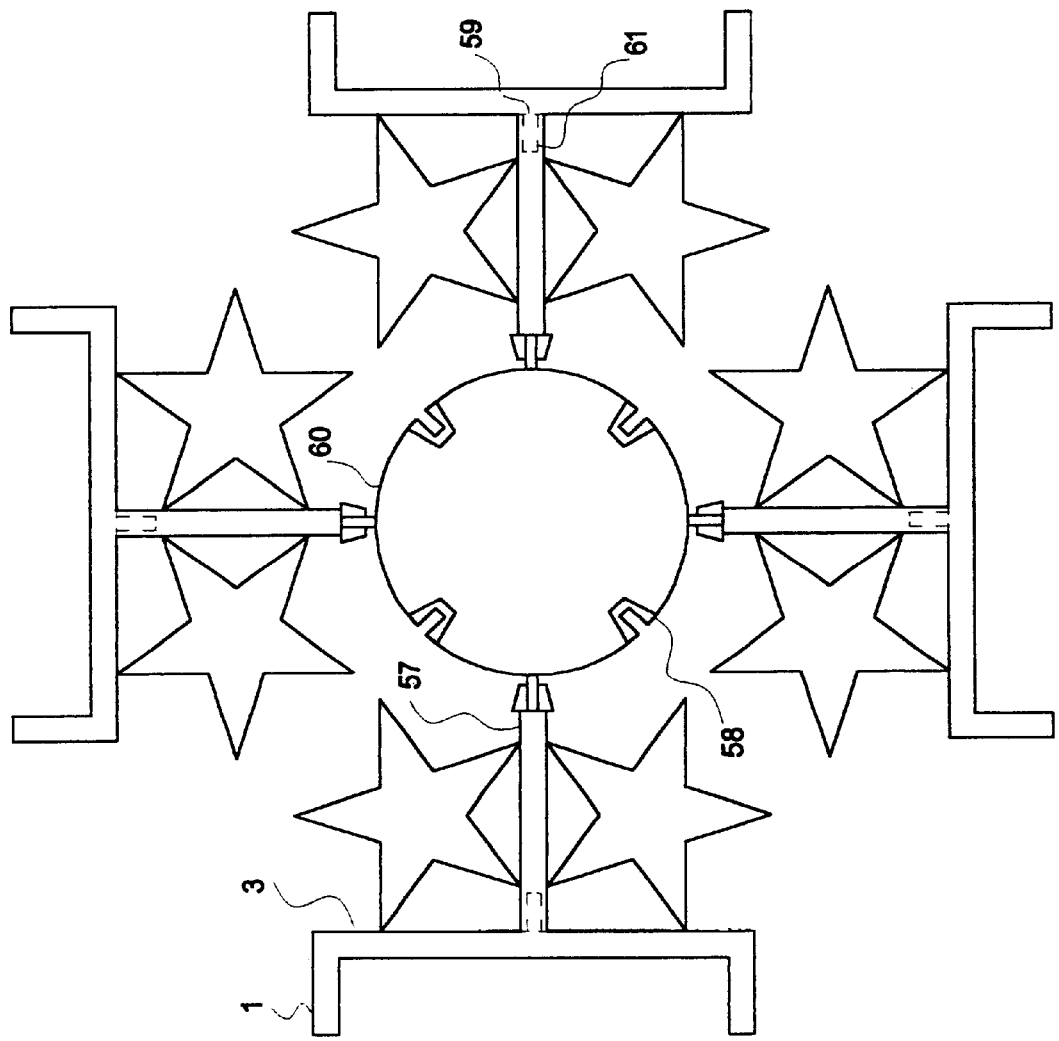
FIG. 14 is a top view of a fourth embodiment of our cord wrap with integrally molded decorations.
Figure 15:
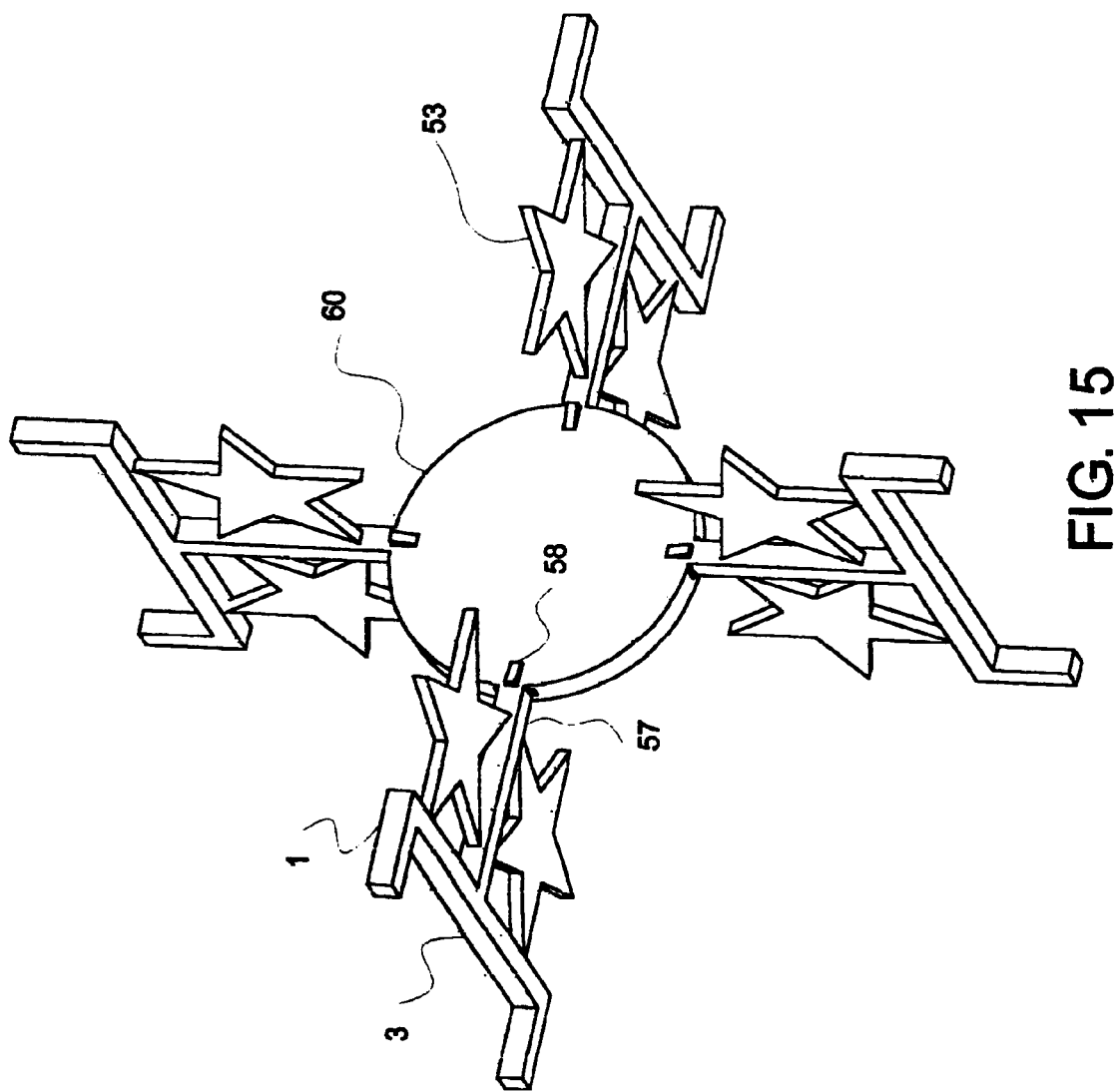
FIG. 15 is a top view of a fifth embodiment of our cord wrap.

Yet another embodiment is shown in FIG. 14. Tapered arms 57 are frangibly molded to a core 60. As can be seen clearly in FIG. 14, each arm 57 has a perpendicular cross bar 3 at its distal end. Two sides 1 at its ends extend from the cross bar and are parallel to the arms 57. When the cross bars 3 are oriented as shown in FIG. 14 the product can be easily made in a two piece mold. However, that orientation is not convenient for holding cords. To allow the cord wrap to hold cords better, the arms 57 may be snapped off of the core 60, rotated 90° and inserted into slots 58 as shown in FIG. 15. Slots 58 which are preferably tapered inward, are sized so that the tapered ends of arms 57 will be frictionally held within the slots 58. Alternatively, to form the cord wrap shown in FIG. 15, each cross bar 3 may be frangibly attached to an arm 57 as indicated by dotted line 59. Then the cross bars can be removed from the arms 57, rotated 90° and reattached to the arms 57. Slot 61 is provided to receive the cross bar 3. Decorations 53 are frangibly attached to each arm 57 and could also be attached to each cross bar 3 and side 1.

Although we have shown certain present preferred embodiments of our cord wrap with integrally molded light holders, decorations, and decoration hangers it should be distinctly understood that the invention is not limited thereto, but may be variously embodied within the scope of the following claims.

We claim:

1. A cord wrap with integrally molded articles comprising:
   (a) a cord wrap body comprised of at least two spaced apart and substantially parallel sides and at least two cross bars each cross bar being connected to two sides; and
   (b) a plurality of articles, each frangibly attached to the cord wrap body, the cord wrap body and articles being integrally formed of molded plastic.

2. The cord wrap with integrally molded articles in claim 1 wherein at least one molded article is attached to one side and at least one molded article is attached to the other side, both articles being between the sides, substantially planar with the sides, and frangibly attached to each other.

3. The cord wrap with integrally molded articles of claim 1 further comprising a hanger, attached to the body.

4. The cord wrap with integrally molded articles of claim 3 wherein the hanger has an opening through which a rod may be extended for hanging cord wrap from the rod.

5. A cord wrap with integrally molded articles comprising:
   (a) a cord wrap body comprised of at least two spaced apart and substantially parallel sides and at least two cross bars each cross bar being connected to two sides;
   (b) at least one buttress connected between one side and one cross bar; and
   (c) a plurality of articles, each frangibly attached to the cord wrap body, the cord wrap body and articles being integrally formed of molded plastic.

6. A cord wrap with integrally molded articles comprising:
   (a) a cord wrap body comprised of at least two spaced apart and substantially parallel sides and at least two cross bars each cross bar being connected to two sides;
   (b) a center post being substantially parallel to, spaced apart from, and between the sides and connected to the two cross bars; and
   (c) a plurality of articles, each frangibly attached to the cord wrap body, the cord wrap body and articles being integrally formed of molded plastic.

7. The cord wrap with integrally molded articles in claim 1 wherein there is a notch in the plastic between the molded article and the cord wrap body so that the molded article may be easily removed from the cord wrap body.

8. A cord wrap with integrally molded articles comprising:
   (a) a cord wrap body comprised of at least two spaced apart and substantially parallel sides and at least two cross bars each cross bar being connected to two sides;
   (b) a hinge between each side and an associated cross bar so that the cord wrap may be formed in a mold having substantially planar cavities and the sides and cross bars may be positioned in two separate planes after the cord wrap is removed from the mold; and
   (c) a plurality of articles, each frangibly attached to the cord wrap body, the cord wrap body and articles being integrally formed of molded plastic.

9. A cord wrap with integrally molded light holders comprising:
   (a) a cord wrap body comprised of at least two spaced apart and substantially parallel sides and at least two cross bars each cross bar being connected to two sides;
   (b) a plurality of light holders each frangibly attached to the cord wrap body, the cord wrap body and articles being integrally formed of molded plastic.

10. A cord wrap with integrally molded articles comprising:
    (a) a front portion of a cord wrap body comprised of two spaced apart and substantially parallel sides and at least two cross bars connecting the sides;
    (b) a rear portion of a cord wrap body comprised of two spaced apart and substantially parallel sides and at least two cross bars connecting the sides, the sides and cross bars having a cross-section sufficiently large in diameter so that the sides and cross bars can act as runners during molding, the rear portion being attached to the front portion and the sides of the rear portion being configured so that the sides of the front portion are aligned with the sides of the rear portion;
    (c) a first plurality of light holders, each light holder being frangibly attached to the front portion, the front portion and light holders being integrally formed of molded plastic; and
    (d) a second plurality of light holders, each light holder being frangibly attached to the rear portion, the rear portion and light holders being integrally formed of molded plastic.

11. The cord wrap with integrally molded articles in claim 10 further comprising a hanger, the hanger being attached to the front portion.

12. The cord wrap with integrally molded articles in claim 11 wherein the hanger has an opening through which a rod may be extended for hanging cord wrap from the rod.

13. The cord wrap with integrally molded articles in claim 10 further comprising at least one buttress connected between one side and one cross bar.

14. The cord wrap with integrally molded articles in claim 10 further comprising a sleeve fitted around the cross bars.

15. The cord wrap with integrally molded articles in claim 10 further comprising:
    (a) a front center post being substantially parallel to, spaced apart from, and between the sides of the front portion and connected to the two cross bars of the front portion; and
    (b) a rear center post being substantially parallel to, spaced apart from, and between the sides of the rear portion and connected to the two cross bars of the rear portion.

16. A cord wrap with integrally molded articles comprising:
    (a) a cord wrap body comprised of two spaced apart U-shaped ends and one center post connecting the ends, each end having a pair of uprights, the uprights being spaced apart, substantially parallel and extending away from the center post; and
    (b) a plurality of articles, each frangibly attached to the cord wrap body, the cord wrap body and articles being integrally formed of molded plastic.

17. The cord wrap with integrally molded articles in claim 16 further comprising at least one molded article which is frangibly attached to a second molded article which is frangibly attached to the body.

18. A mold for forming a cord wrap and integrally molded articles comprising:

a mold block having a plurality of cavities shaped to form selected articles, the mold block having at least two mold sections having mating faces which can be moved apart to open the cavities, the mold having at least two spaced apart and substantially parallel side runners and at least two cross runners each cross runner connected to two side runners, each cavity being connected to a runner so that plastic can be injected through the runners into the cavities, wherein the side runners and the cross runners are of sufficient length and sufficiently large in diameter to form a cord wrap structure that can hold at least one string of decorative lights wrapped around that portion of the cord wrap structure formed by the cross runners after the integrally molded articles have been separated from the cord wrap structure.

19. The mold in claim 18 wherein the mold has a cavity shaped to form a hanger, the cavity being connected to a runner.

20. The mold in claim 19 wherein the cavity shaped to form a hanger is shaped so that the hanger has an opening through which a rod may be extended for hanging the cord wrap from the rod.

21. A mold for forming a cord wrap and integrally molded articles comprising:

a mold block having a plurality of cavities shaped to form selected articles, the mold block having at least two mold sections having mating faces which can be moved apart to open the cavities, the mold having at least two spaced apart and substantially parallel side runners and at least two cross runners, each cross runner connected to two the side runners, each cavity being connected to a runner so that plastic can be injected through the runners into the cavities, wherein the mold has at least one cavity in the shape of a buttress, the cavity being connected between one side runner and one cross runner.

22. A mold for forming a cord wrap and integrally molded articles comprising:

a mold block having a plurality of cavities shaped to form selected articles, the mold block having at least two mold sections having mating faces which can be moved apart to open the cavities, the mold having at least two spaced apart and substantially parallel side runners, at least two cross runners each cross runner connected to two the side runners and a center runner, the center runner being substantially parallel to, spaced apart from, and between the side runners and connected to the two cross runners, each cavity being connected to a runner so that plastic can be injected through the runners into the cavities.

23. The mold for forming a cord wrap and integrally molded articles in claim 18 wherein at least two cavities are between the side runners and a third runner directly connects the two cavities between the side runners.

24. A mold for forming a cord wrap and integrally molded articles comprising:

a mold block having a plurality of cavities shaped to form selected articles, the mold block having at least two mold sections having mating faces which can be moved apart to open the cavities, the mold having at least two spaced apart and substantially parallel side runners and at least two cross runners each cross runner connected to two the side runners, wherein the runners are positioned to provide two U-shaped sections connected by a center post runner, each cavity being connected to a runner so that plastic can be injected through the runners into the cavities.

25. A cord wrap with integrally molded articles made by the process of:

(a) providing a mold, the mold comprising a mold block having a plurality of cavities shaped to form selected articles, the mold block having at least two mold sections having mating faces which can be moved apart to open the cavities, the mold having at least two spaced apart and substantially parallel side runners and at least two cross runners each cross runner connected to two side runners, each cavity being connected to a runner so that plastic can be injected through the runners into the cavities;

(b) injecting plastic into the mold to fill cavities and runners within the mold;

(c) allowing the plastic to set;

(d) opening the mold; and (e) removing the plastic.

\* \* \* \* \*

UNITED STATES PATENT AND TRADEMARK OFFICE
CERTIFICATE OF CORRECTION

PATENT NO.   : 6,360,899 B1
DATED        : March 26, 2002
INVENTOR(S)  : Jeffrey B. Smith, William E. Adams and Matthew French It is certified that error appears in the above-identified patent and that said Letters Patent is hereby corrected as shown below:

<u>Column 6,</u>
Line 10, after "two" insert -- and --.

Signed and Sealed this

Second Day of July, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,360,899 B1
DATED : March 26, 2002
INVENTOR(S) : Jeffrey B. Smith, William E. Adams and Matthew French It is certified that error appears in the above-identified patent and that said Letters Patent is hereby corrected as shown below:

Title page,
Item [75], Inventors, please delete "Jeffrey B. Smith; William E. Adams; Matthew French, all of Lawrence County, PA (US)" and insert -- Jeffrey B. Smith, Lawrence County, PA (US); William E. Adams, Butler County, PA (US); Matthew French, Lawrence County, PA (US) --

Column 6,
Line 10, after "sides;" insert -- and --.

Signed and Sealed this

Fifteenth Day of July, 2003

JAMES E. ROGAN
*Director of the United States Patent and Trademark Office*